July 7, 1964     PAUL-GÜNTHER ERBSLÖH ETAL     3,139,983
APPARATUS FOR PRODUCING METAL-CLAD EXTRUDED BODIES
Filed June 20, 1961     3 Sheets-Sheet 1

INVENTORS:
Paul-Günther Erbslöh and Horry Wilke
BY
Western, Ross & Western

3,139,983
APPARATUS FOR PRODUCING METAL-CLAD EXTRUDED BODIES

Paul-Günther Erbslöh, Wuppertal-Barmen-Blombach, and Harry Wilke, Wuppertal-Ronsdorf, Germany, assignors to Julius & August Erbsloh Kommanditgesellschaft, Wuppertal-Barmen, Germany
Filed June 20, 1961, Ser. No. 118,468
8 Claims. (Cl. 207—4)

Our present invention relates to the production of metal-clad extruded bodies and, more particularly, to apparatus for the continuous production of metal-clad extruded bodies; this application is a continuation-in-part of our co-pending application Ser. No. 785,388, filed January 7, 1959, now patent No. 3,021,004, issued February 13, 1962.

In our aforementioned co-pending application and our co-pending application Ser. No. 118,469, filed concurrently herewith, we broadly disclose apparatus for the simultaneous extrusion and metal-coating of profiled bodies to produce desirable surface characteristics. It is well known that both hard and soft metals can be extruded through dies under relatively high pressure, thereby producing profiled elongated bodies of complex configurations at moderate cost. Such bodies, which may later be cut into large or small lengths, generally have very poor surface qualities although, as a whole, they may possess reasonably good mechanical properties. Consequently, it has been proposed hitherto to lubricate the extrudable-metal billet with graphite, soft metals of the like prior to or during the extrusion process in order to accelerate the latter process and to produce extruded bodies having a suitable surface finish. Occasionally, the dies used for such processes were provided with pockets adapted to hold quantities of the lubricant so that the addition of further amounts thereof during extrusion was not necessary. While the use of lubricants has been found to add to the life of the dies employed, the surface finishes obtained were nevertheless often unsatisfactory and the extruded body frequently required further surface treatment.

It is the principal object of the present invention to provide a relatively inexpensive and effective apparatus for producing metal-clad extruded bodies by a simultaneous extrusion and metal-coating process.

Another object of our invention is to provide means on a conventional extrusion press whereby extruded bodies coated with an even metallic layer may be produced.

Yet a further object of this invention is the provision of an apparatus for forming metal-clad extruded bodies directly at the extruding die so as to obviate the need for auxiliary reservoirs of coating metal and means, disposed downstream from the die, for depositing the metal on the previously extruded body.

According to a feature of the invention, extruded profiled bodies of, for example, low-purity aluminum or aluminum alloys (e.g. copper-containing alloys comprising aluminum of a purity of 98% or less), which have good mechanical properties (i.e. relatively high strength and good electrical and/or thermal conductivity), may be formed simultaneously with a corrosion-resistant surface layer of a high purity aluminum (e.g. from 99.8% to 99.99%), which has a bright, readily polished surface, in a device which comprises an extrusion plunger, a billet chamber and an extruding die in combination with preferably hydraulic brake means for retarding the advance of the die.

The generally elongated billet chamber is, according to a specific feature of the invention, formed with support means for a die holder at its extremity remote from the press plunger and, preferably, aligned therewith. At least in the initial stages of operation, the die holder and the die project with all-around peripheral clearance into the billet chamber and define an annular space at the die end of the latter, this space being adapted to receive a slug, block or billet of a coating material which, like the material of the body- or core-forming billet, is flowable under pressure and may be extruded through the die. The annular space or compartment, for the coating material, whose cross-sectional area is preferably equal to a substantial fraction of that of the chamber, extends from the die face to the billet-chamber wall at the die end of the chamber and communicates directly with the main compartment thereof which contains the core-forming billet. The core-forming material thus entrains the coating-forming material along with its outer surfaces into the die to produce the metal-clad body.

In order to afford control of the thickness of the coating and to assure continuous and even coating of the body being formed at the die aperture, we provide means for continuously maintaining the interface between the two materials substantially at the level of the die face. Advantageously, the die holder is longitudinally displaceable relative to the chamber wall at the die end of the chamber whereby the coating-material compartment may be reduced in size in accordance with the quantity of coating material consumed in forming the metal-clad body while the aforementioned interface is nevertheless held substantially level with the die face. The thickness of the coating may then be controlled by regulating the displacement of the die holder and, consequently, the rate of decrease of the size of the coating-material compartment.

According to a more specific feature of the invention, the billet of coating material may be preshaped to conform to the normal flow lines of material being extruded. Thus, the coating-material billet may be formed with an upstream end surface which conically converges toward the die while the core-material billet is formed with a complementary surface so that the interface between the two materials converges toward the die along the normal flow lines of material being extruded.

The die holder co-operates with suitable braking means which may be adjustable in order to regulate the thickness of the coating. Thus the braking means may merely be one or more members frictionally engaging the die holder and urged thereagainst with controllable pressures, thereby regulating the rate of displacement of the die holder. The braking means may, according to a particularly suitable and economical construction of the apparatus, make use of the viscous-damping characteristics of fluids to afford control of the die-holder movement.

In accordance to yet another specific aspect of our invention, instead of being displaced under pressure transmitted via the core-forming billet from the press plunger, the die holder may be coupled to an externally operable device for moving the holder. In the latter case, the device may be manually operated or linked to the press for operation thereby.

The above and other objects, features and advantages of our present invention will become more readily apparent from the following description, reference being made to the accompanying drawing in which.

Figure 1:
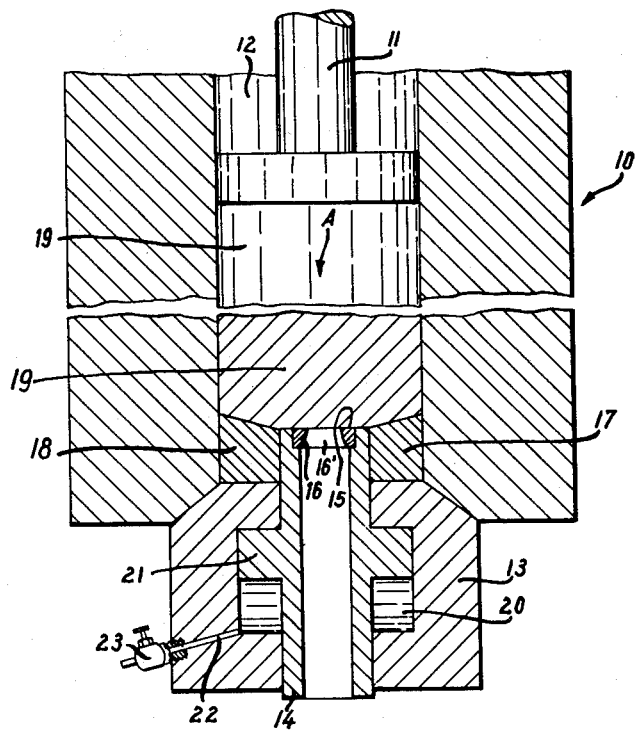
FIG. 1 is an axial cross-sectional view through the billet chamber of an extrusion press, according to one embodiment of the invention.
Figure 2:
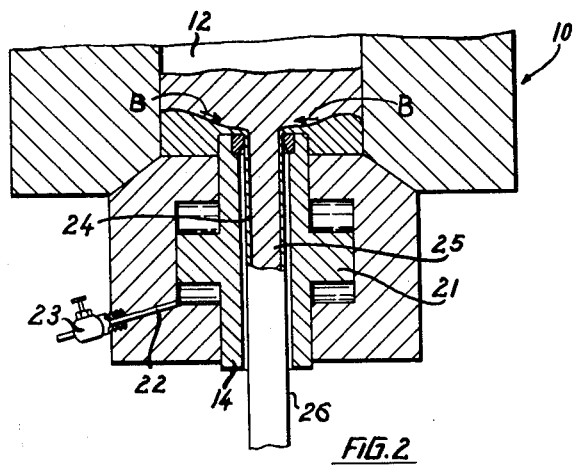
FIG. 2 is a view similar to FIG. 1 of the apparatus thereof in a further stage of operation.

In FIGS. 1 and 2 of the drawing we show an extrusion press 10, which may generally be of a conventional type and, therefore, need not be disclosed in detail in the present application. The press plunger 11 is displaceable within the billet chamber 12 which, at its extremity remote from the plunger, is closed by an anvil block 13. The latter carries a die holder 14, which is displaceable along the axis of the chamber from a starting position wherein the face 15 of its die 16 is disposed a certain distance inwardly from the entrance of chamber 12, whereby the generally tubular die holder or backer 14 extends partly into the chamber and forms therein an annular compartment 17. The latter compartment is shown to contain a ring-shaped billet 18 of a coating material which is flowable under pressure. A billet 19 of a core-forming material is disposed in the chamber 14 adjacent the die face 15 and in abutting engagement with the billet 18. The two billets are formed with complementary interfacial surfaces conically converging toward the die 16, whose aperture 16' is dimensioned to correspond to the desired dimensions of the finished metal-clad body, along the normal flow lines of an extrusion process.

The block 13 is provided with a cylindrical cavity 20 within which a shoulder 21, formed integrally with the die holder 14, acts in the manner of a piston against a fluid (e.g. a viscous liquid) which is ejected from the cavity via a bore 22. The latter terminates in a stopcock 23 or some other flow-control device. By regulating the flow of fluid from the cavity 20 as the die holder 14 and its shoulder 21 are displaced in the direction of extrusion by the forces transmitted to the holder from the plunger 11 via the billet 19, the thickness of the coating 24 applied to the extruded core 25 can be controlled within a considerable range.

At the commencement of the extruding operation, the die holder 14 is in the position shown in FIG. 1. The annular billet 18 of coating material is then inserted into the space 17 around the portion of the holder projecting into the chamber 12 and the billet 19 is disposed within the billet chamber 12 in engagement with the die face 15 and the billet 18. The plunger 11 of the press then begins its stroke and compresses the billet 19 in the direction of arrow A toward the aperture 16' of the die, whereupon the materials of billets 18 and 19 flow under the applied pressure in the direction of the arrows B which indicate the flow direction at the interface between the two billets. The material of the core-forming billet 19 thus entrains along with it a surface layer of the coating material from billet 18 through the die aperture 16' to produce the metal-clade body 26 shown in FIG. 2. As the extrusion process proceeds, the die holder 14 is displaced under the pressure of the billet 19 in the direction of the arrow A against a retarding or braking force supplied by the counterpressure exerted upon shoulder 21 by the fluid contained within cavity 20. If the die holder 14 were not displaceable, the entrainment of coating material through the die by the core-forming material of billet 19 would halt as soon as the interface between the billets coincided with the plane of the die face 15. Since, however, the die holder 14 yields in the direction of extrusion by virtue of the fact that the fluid of cavity 20 is controlledly ejected therefrom under the press force, the volume of the annular space 17 decreases continuously with the progress of extrusion so that additional quantities of the coating material are successively exposed to the entraining action of the material of billet 19 and a uniform coating of the extruded core 25 results. Although the billets 18 and 19 shown in FIG. 1 were stated to be preformed with interfacial surfaces conically converging toward the die, it should be understood that this interface may initially lie in the plane of the die face 15, if so desired. Soon after the start of operations, however, it will be noticed that, owing to even a small displacement of the die holder 14 in the direction of arrow A, the interface gradually attains the aforedescribed conical configuration which converges toward the die face 15.

The rate of discharge of the fluid from cavity 20 through the control valve 23 is, of course, selected to be proportional to the rate at which the material of billet 19 is extruded through the die aperture, thereby guaranteeing a uniform thickness of coating.

Figure 3:
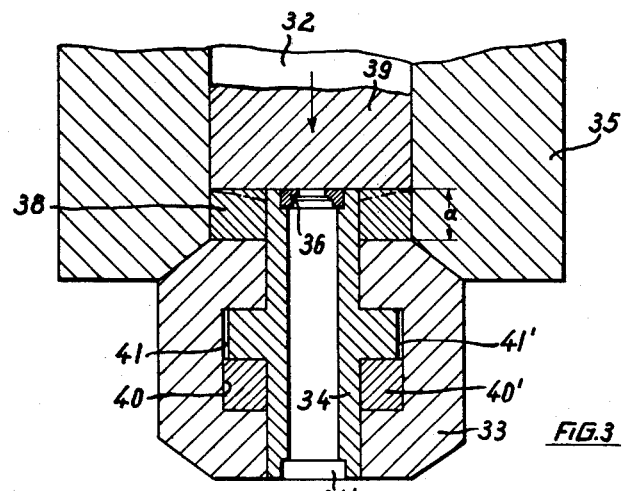
FIG. 3 is an axial-cross-sectional view through the billet chamber of another extrusion press according to the invention.
Figure 4:
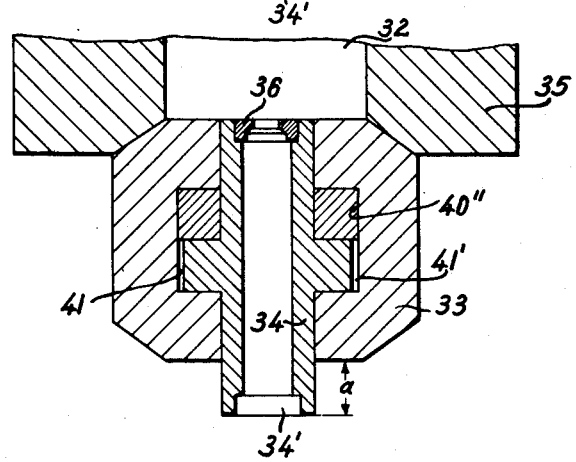
FIG. 4 is a view similar to FIG. 3 of the apparatus thereof at the conclusion of operations.

In FIGS. 3 and 4 we show another embodiment of the invention wherein the block 33, which abuts the housing 35 formed with the billet chamber 32, is reversible relatively thereto. The die holder 34 is then formed with socket portions 34', at either end thereof, adapted to receive the die 36. In contradistinction to the embodiment previously described, the block 33 is formed with a closed cylindrical cavity 40 within which an annular shoulder 41 of the holder 34 is reciprocable. The shoulder 41 is formed with a plurality of longitudinally extending peripheral passages 41' through which a fluid 40', contained within the cavity 40, is forced when pressure is applied to the die holder 34, thereby retarding the motion of the latter. The fluid 40' may again be a substance such as a soft metal (e.g. sodium amalgam, lead alloy or the like) which is flowable under the pressures applied to the holder 34.

In operation, the block 33 is initially disposed as shown in FIG. 3 with its die holder 34 extending a distance $a$ into the billet chamber 32. As previously described, an annular billet 38 is placed in the annular space about the die holder 34 and comprises the coating material, while a billet 39 of core-forming material is disposed in the upstream portion of the chamber 32 and is urged against the face of die 36 by a suitable plunger or ram. The pressure applied to the holder 34 forces the flowable material 40' through the passages 41' from one side of the shoulder 41 to a space which increases in size on the other side of the shoulder within cavity 40 as the holder 34 progressively yields to the applied pressure. The interface between the two billets 38 and 39 originally lying substantially in the plane of the die face, gradually assumes a conical configuration tapering toward the die 36 (e.g. as shown in dot-dash lines in FIG. 3). As fully described with reference to FIGS. 1 and 2, the material of billet 39 then entrains material derived from billet 38 along with it into the die 36, thereby forming a metal-clad extruded body.

At the conclusion of the extruding process, the die 36 lies substantially flush with the end walls 42 of the compartment 32 while the opposite extremity of die holder 34 protrudes a distance $a$, best seen in FIG. 4, from the block 33. The die 36 is then removed from its socket and fitted into the other socket 34', whereupon the block 33 may be rotated through an angle of 180° about an axis perpendicular to that of the holder 34 to prepare the apparatus for a further extrusion cycle. The fluid 40' is again ready to serve as a retarding means adapted to control the thickness of the coating. The oppositely located portions of block 33, which engage the housing 35 of billet chamber 32 in their respective operating positions, are preferably formed with projections and/or depressions complementary to mating surface formations of the housing 35 in order to facilitate the proper positioning of the block upon each reversal.

Figure 5:
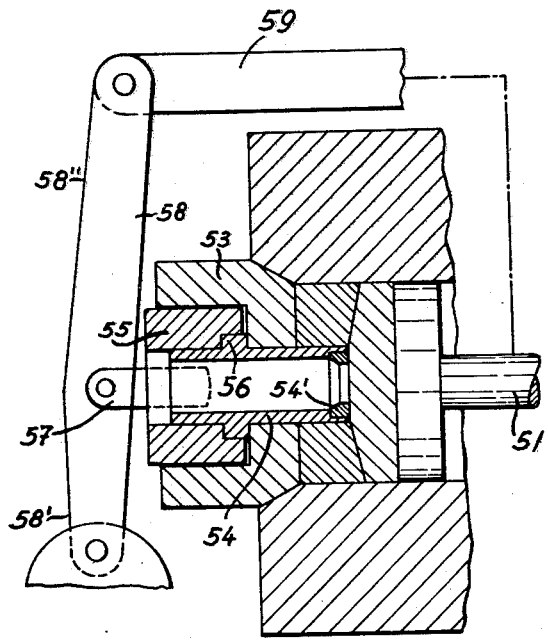
FIG. 5 is another view similar to those of FIGS. 1 and 3, illustrating a thickness control device according to still another embodiment of the invention.

In FIG. 5 we show an embodiment of our invention, generally similar to that illustrated in FIGS. 1 and 2, wherein the block 53, instead of being provided with fluid-controlled motion-retarding means acting upon the die holder 54, receives a sleeve 55 which bears on the shoulder 56 of the holder and is secured to a pair of link bars 57 (one shown). The latter are pivotally connected to a lever 58 at a location intermediate its fulcrumed extremity 58' and its other extremity 58", which is articulated to a connecting bar 59. Bar 59 is shown schematically to be connected to the plunger 51 for simultaneous displacement together therewith.

In operation, a metal-clad extruded body emerges from the die 54' of the holder 54 as fully described with reference to FIGS. 1 and 2. The thickness of the coating layer is again determined by the rate of yielding or displacement of the tool holder in the direction of extrusion under the pressure of plunger 51. Unlike the earlier-described embodiments, however, the holder 54 is urged against the sleeve 55, which yields in proportion to the travel of plunger 51, rather than against a fluid braking medium. The thickness of the coating may be increased or lowered by increasing or lowering the rate of displacement of the holder via a corresponding change in the location of the pivots 57' of bars 57 along the lever 58. If the pivots 57' are located closer to the fulcrumed extremity 58' of the lever, the rate of displacement of holder 54 will be proportionately slower and the thickness of the coating thinner for a particular rate of plunger travel; on the other hand, if the pivots 57' are located closer to the other extremity 58" of the lever 58, the thickness of the coating will be proportionately greater.

Figure 6:
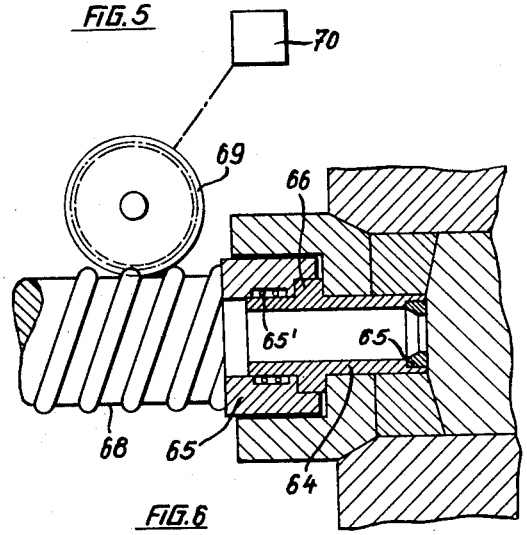
FIG. 6 is a view similar to FIG. 5 of another thickness-control device.

The embodiment of the invention illustrated in FIG. 6 is generally similar to that whose operation is described above with reference to FIG. 5; the lever linkage of the latter is replaced in FIG. 6 by a tubular worm 68 which is rigidly connected to a sleeve 65 bearing on the shoulder 66 of the holder 64. The worm 68, which is longitudinally shiftable, meshes with a drive gear 39; the latter is, in turn, coupled to the press-control system 70, shown schematically. Press-control system 70 regulates the position of the extrusion piston within the billet chamber and may be provided with an element responsive to the position of the piston. This element in turn controls the worm wheel 69 in mesh with the worm 68. Thus the element may comprise a servo master whose slave rotates the worm wheel 69 in the usual manner. The sleeve 65 thus yields in accordance with the velocity and location of the press plunger to regulate the thickness of the coating on the metal-clad body extruded through the die. Since the worm 68 rotates relatively to the holder 64, the sleeve 65 may be provided with a bearing 65' to permit relative rotation without entrainment of the die holder 64.

The invention as described and illustrated is believed to admit of many modifications and variations which are deemed to be included within its spirit and scope as claimed and will be readily apparent to persons skilled in the art.

We claim:

1. In an extrusion press for producing profiled bodies, in combination, a housing formed with a generally elongated billet chamber having a partially closed discharge extremity, a longitudinally displaceable die holder disposed in said housing at said extremity, said die holder having a rearward portion adapted to project with peripheral clearance into said chamber in an extreme position of said holder, thereby forming at said extremity with the longitudinal walls of said chamber an annular compartment communicating annularly with the remainder of said chamber over a cross-sectional area substantially equal to that of said compartment in a transverse plane, a die in said holder, pressure means in said chamber remote from said extremity for forcing a billet of a first material flowable under pressure through said die, thereby tending to displace same in the direction of displacement of said first material, and control means engaging said holder for regulating the rate of displacement thereof under the force of said pressure means to dispense a continuous flow of a second material flowable under pressure and disposed in said compartment substantially uniformly around said first material for entrainment thereby through said die whereby said second material forms a surfacing layer on the body thus produced.

2. The combination according to claim 1 wherein said control means comprises hydraulic means acting upon said die holder.

3. The combination according to claim 2 wherein said hydraulic means includes a receptacle for a fluid, piston means secured to said holder for compressing said fluid, and regulator means for controlling the flow of fluid in said receptacle.

4. The combination according to claim 1 further including coupling means between said control means and said pressure means for controlling the yielding of said die holder in step with the rate of extrusion through said die.

5. The combination according to claim 4 wherein said pressure means includes a plunger engaging the billet of said first material, said coupling means comprising a lever linkage connected with said plunger and exerting a force on said die holder counter to that of said pressure means.

6. In an extrusion press for producing profiled bodies, in combination, a housing formed with a generally elongated billet chamber having a partially closed discharge extremity, a longitudinally displaceable die holder disposed in said housing at said extremity, said die holder having a rearward portion adapted to project with peripheral clearance into said chamber in an extreme position of said holder, thereby forming with the longitudinal walls of said chamber an annular compartment communicating annularly with the remainder of said chamber over a cross-sectional area substantially equal to that of said compartment in a transverse plane, a die in said rearward portion having its inner face lying substantially at the end thereof, pressure means in said chamber remote from said extremity for forcing a billet of a first material flowable under pressure through said die, thereby tending to displace same in the direction of displacement of said first material, and control means engaging a forward portion of said holder for regulating the rate of displacement thereof under the force of said pressure means to dispense a continuous flow of a second material flowable under pressure and disposed in said compartment substantially uniformly around said first material for entrainment thereby through said die whereby said second material forms a surfacing layer on the body thus produced.

7. The combination according to claim 6 wherein said control means comprises a receptacle for a fluid, piston means secured to said rear portion of said holder for compressing said fluid, and regulator means for controlling the flow of fluid in said receptacle.

8. In an extrusion press for producing profiled bodies, in combination, a housing formed with a generally elongated billet chamber having a partially closed discharge extremity, a longitudinally displaceable die holder disposed in said housing at said extremity, said die holder having a rearward portion adapted to project with peripheral clearance into said chamber in an extreme position of said holder, thereby forming with the longitudinal walls of said chamber an annular compartment communicating annularly with the remainder of said chamber over a cross-sectional area substantially equal to that of said compartment in a transverse plane, the cross-sectional area of said compartment being a substantial fraction of that of said chamber, a die in said rear portion having its inner face lying substantially at the end thereof, pressure means in said chamber remote from said extremity for forcing a billet of a first material flowable under pressure through said die, and braking means engaging a forward portion of said holder for limiting the rate of displacement thereof under the force of said pressure means, whereby a continuous flow of a second material flowable under pressure and disposed in said compartment is carried by said first material through said die and forms a surfacing layer on the body thus produced.

References Cited in the file of this patent

FOREIGN PATENTS 624,466     Great Britain _____ June 9, 1949